(12) United States Patent
Pischiera et al.

(10) Patent No.: US 9,283,489 B2
(45) Date of Patent: Mar. 15, 2016

(54) UNIVERSAL VEHICLE SELF-RIGHT APPARATUS

(71) Applicants: Enrico Pischiera, Apopka, FL (US); Thomas Enrico Pischiera, Palm Bay, FL (US); Vincent Dimino, Brooklyn, NY (US)

(72) Inventors: Enrico Pischiera, Apopka, FL (US); Thomas Enrico Pischiera, Palm Bay, FL (US); Vincent Dimino, Brooklyn, NY (US)

( * ) Notice: Subject to any disclaimer, the term of this patent is extended or adjusted under 35 U.S.C. 154(b) by 38 days.

(21) Appl. No.: 14/513,033

(22) Filed: Oct. 13, 2014

(65) Prior Publication Data
US 2015/0137497 A1  May 21, 2015

Related U.S. Application Data

(60) Provisional application No. 61/907,012, filed on Nov. 21, 2013.

(51) Int. Cl.
| A63H 17/00 | (2006.01) |
| --- | --- |
| B60R 21/13 | (2006.01) |
| A63H 17/26 | (2006.01) |
| B62D 49/08 | (2006.01) |

(52) U.S. Cl.
CPC .............. *A63H 17/262* (2013.01); *A63H 17/00* (2013.01); *A63H 17/004* (2013.01); *B60R 21/13* (2013.01); *B62D 49/08* (2013.01)

(58) Field of Classification Search
CPC ...... B62D 49/08; B60R 21/13; B60R 21/131; B60R 2021/134; B60R 2021/135; B60S 9/00; B60S 9/02; B60S 9/04; B60S 9/14; B60S 9/18; A62H 17/262
See application file for complete search history.

(56) References Cited

U.S. PATENT DOCUMENTS

| 4,241,803 A * | 12/1980 | Lauber ................... B60G 17/00 180/8.1 |
| --- | --- | --- |
| 5,205,585 A * | 4/1993 | Reuber ................... B60R 21/13 280/753 |
| 5,224,735 A * | 7/1993 | Jambor ................... B60R 21/13 280/756 |
| 5,931,499 A * | 8/1999 | Sutherland .............. B60R 21/00 180/282 |
| 6,170,847 B1 * | 1/2001 | Pham ................... B62D 31/003 180/209 |
| 6,394,738 B1 * | 5/2002 | Springer ................ B62D 49/08 187/232 |
| 6,938,924 B2 * | 9/2005 | Feldman ................. B60R 99/00 180/282 |
| 6,939,197 B1 * | 9/2005 | Hoeting ................ A63H 17/004 446/437 |
| 7,467,684 B2 * | 12/2008 | Wang ................... B60R 21/0132 180/282 |
| 7,494,153 B2 * | 2/2009 | Wang ................... B60R 21/0132 280/298 |
| 7,673,902 B2 * | 3/2010 | Jayasuriya .............. B60R 3/002 280/755 |
| 7,862,083 B2 * | 1/2011 | Jayasuriya .............. B60R 3/002 180/282 |
| 8,739,676 B2 * | 6/2014 | Ames ...................... F41H 7/044 342/70 |
| 8,974,265 B2 * | 3/2015 | Wallace ................ A63H 17/004 446/176 |
| 2005/0242557 A1 * | 11/2005 | Wang ................... B60R 21/0132 280/755 |
| 2013/0252510 A1 * | 9/2013 | Wallace ................ A63H 17/262 446/465 |

* cited by examiner

*Primary Examiner* — Barry Gooden, Jr.

(57) ABSTRACT

A self-right apparatus is a device for automatically returning an overturned vehicle to an upright orientation. The device features a base plate that is mountable to a vehicle and a flip plate that is hingedly connected to the base plate via a pivot axle. The flip plate is held in place by a trigger mechanism engaged to a catch until the device is ready to be deployed to flip the overturned vehicle. The device utilizes a clutched servo mechanism that is connected to the trigger mechanism. The clutched servo mechanism is actuated in order to release the trigger mechanism from the catch and allow the flip plate to rotate about the pivot axle via force provided by a plurality of torsion springs. The flip plate is pressed against the surface on which the vehicle has become overturned, causing the vehicle to flip and return to its original upright orientation.

20 Claims, 13 Drawing Sheets

UNIVERSAL VEHICLE SELF-RIGHT APPARATUS

The current application claims a priority to the U.S. Provisional Patent application Ser. No. 61/907,012 filed on Nov. 21, 2013.

FIELD OF THE INVENTION

The present invention relates generally to an apparatus for vehicles. More specifically, the present invention is a self-right apparatus for automatically returning an overturned vehicle to the vehicle's original upright orientation.

BACKGROUND OF THE INVENTION

Radio controlled or remote controlled (R/C) vehicles are vehicles that are scaled-down models of their full-sized counterparts. The vehicles are self-propelled as well as self-powered and are often controlled wirelessly through a controller device. One of the most common types of R/C vehicles is the R/C car. R/C cars are driven on a surface much like their full-sized counterparts. As can be expected, R/C cars often have the tendency to flip onto their sides or entirely upside-down. It is common to navigate an R/C car through challenging courses and perform stunts such as driving the R/C car off of a ramp. Once overturned, there is generally no way for the R/C car to automatically return to its normal position and continue operating. This can be highly inconvenient as the operator of an R/C car generally controls the R/C car from a distance. As such, the operator must move over to the overturned R/C car and physically place the R/C car back into its normal upright position. In addition to inconveniencing the operator, an R/C car that becomes temporarily inoperable due to being overturned can present a hazard as well. R/C cars are often deployed on the very same roads that are traveled by automobiles and bicyclists. An R/C car that becomes stuck in the path of oncoming traffic on a roadway may become damaged or destroyed as well as cause damage to any automobiles that strike the R/C car. Due to the aforementioned issues, a means of automatically righting an overturned vehicle is desirable.

The present invention is a self-right apparatus for allowing the operator of an overturned vehicle to automatically return the vehicle to its original upright orientation. In an embodiment of the present invention, the self-right apparatus is retrofitted to the roof or side of an R/C car. The present invention is primarily designed for use with R/C vehicles such as R/C cars. However, various embodiments of the present invention may be utilized in conjunction with conventional automobiles as well. The present invention allows the operator of an overturned R/C car to automatically self-right the R/C car without being required to move over to and physically place the R/C car back into its normal upright position. The self-right apparatus is activated remotely by the operator although alternatively, the self-right apparatus may be activated automatically upon the R/C being overturned. After the R/C car has been returned to its original upright orientation, the self-right apparatus may be reset for a subsequent deployment in the future.

DETAIL DESCRIPTIONS OF THE INVENTION

All illustrations of the drawings are for the purpose of describing selected versions of the present invention and are not intended to limit the scope of the present invention.

Figure 1:
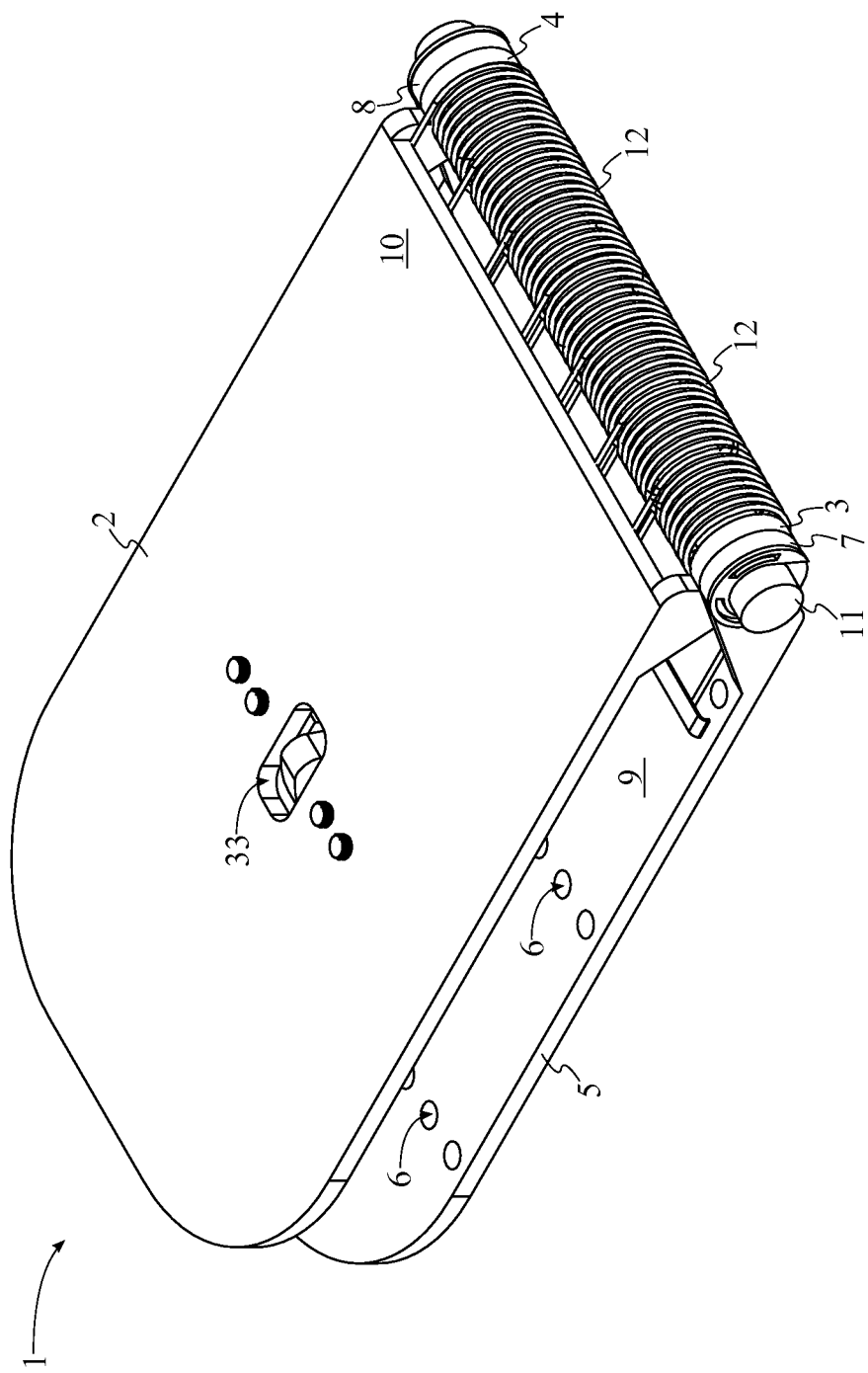
FIG. 1 is a perspective view of the present invention in a primed configuration.
Figure 2:
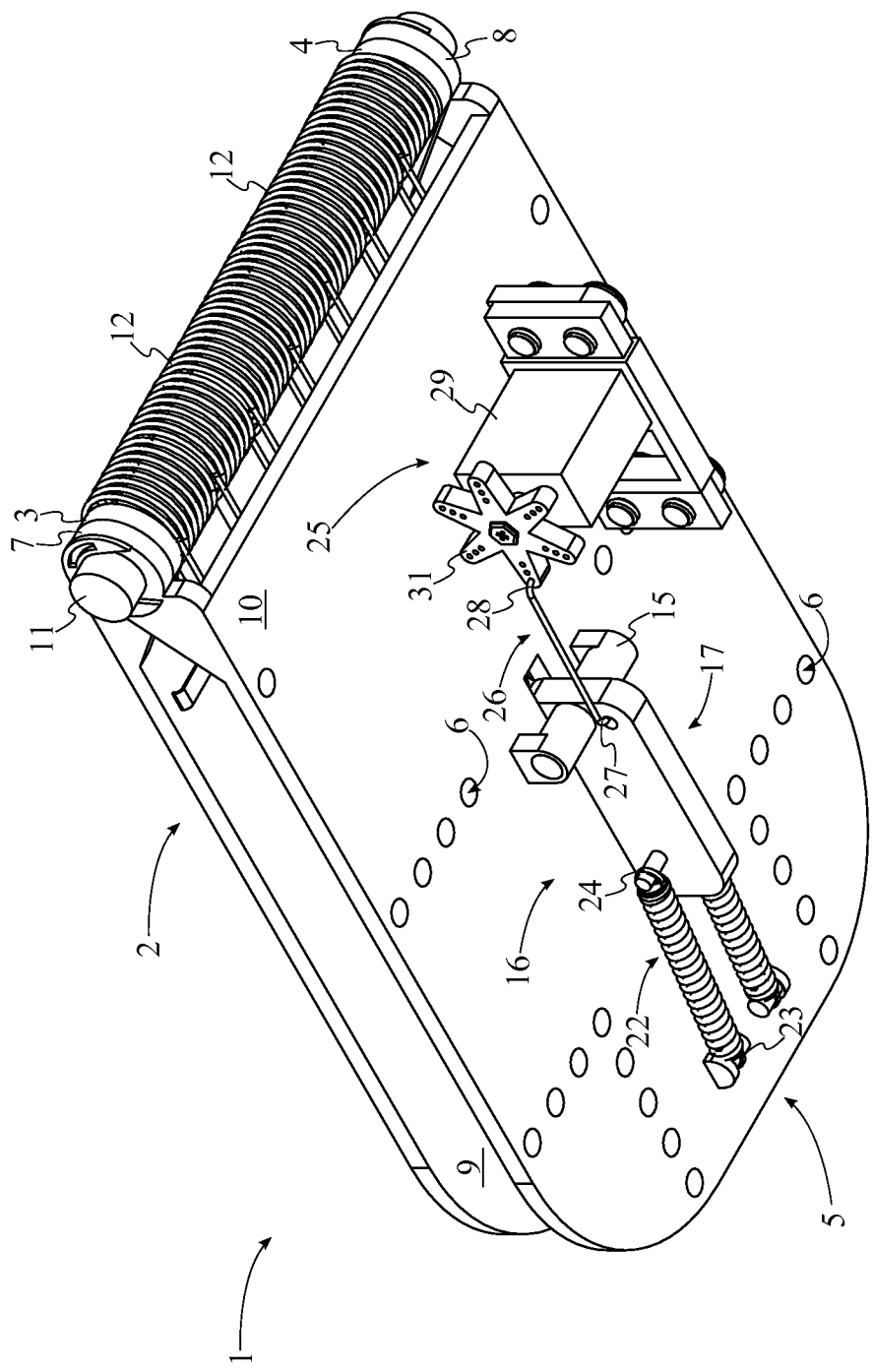
FIG. 2 is an alternative perspective view of the present invention in the primed configuration.
Figure 3:
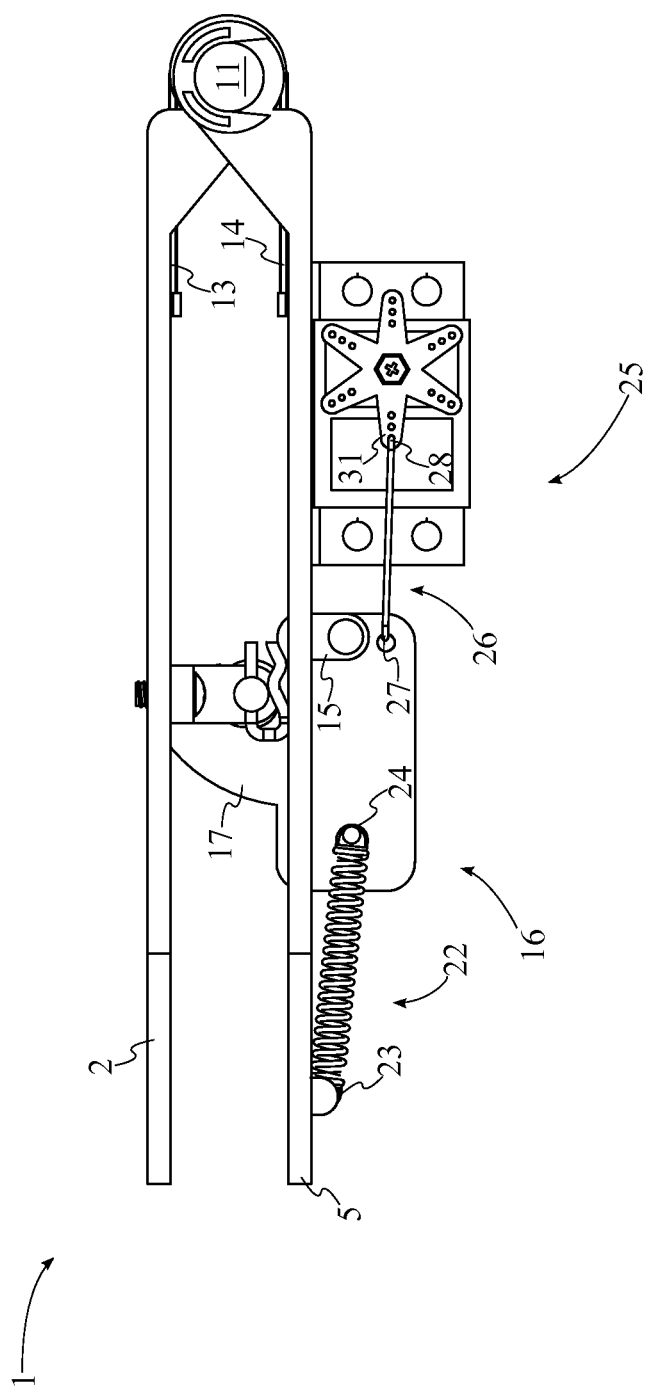
FIG. 3 is a side view of the present invention in the primed configuration.

The present invention is a self-right apparatus for automatically returning an overturned vehicle to an upright orientation. With reference to FIGS. 1-3, the present invention comprises a spring-loaded piano hinge 1, a trigger mechanism 16, a fulcrum 15, a clutched servo mechanism 25, and a catch 32. The spring-loaded piano hinge 1 serves to forcibly flip the overturned vehicle to its original upright orientation. The trigger mechanism 16 maintains the spring-loaded piano hinge 1 in a primed configuration while the catch 32 serves to maintain the trigger mechanism 16 in place until the trigger mechanism 16 is actuated. The trigger mechanism 16 is able to rotate about the fulcrum 15 in order to release from the catch 32. The clutched servo mechanism 25 is utilized to release the trigger mechanism 16 from the catch 32 when the user wishes to bring the overturned vehicle to its original upright configuration. The clutched servo mechanism 25 is clutched in order to ensure that the spring-loaded piano hinge 1 does not deploy until needed. The clutched servo mechanism 25 is clutched in order to engage and disengage its servo from its rotational output. When the clutched portion is engaged, the servo is torsionally connected to the rotational output and, thus, the servo is able to activate the trigger mechanism 16. When the clutched portion is disengaged, the rotational output is able to rotate freely from the servo and, thus, the trigger mechanism 16 stays cocked.

With reference to FIGS. 1-3, the spring-loaded piano hinge 1 comprises a flip plate 2 and a base plate 5. The flip plate 2 and the base plate 5 each comprise an inner surface 9 and an outer surface 10. The base plate 5 may be mounted to a top surface, a side surface, or other suitable surface of the vehicle with the outer surface 10 of the base plate 5 oriented toward the vehicle. When the vehicle is overturned, the outer surface 10 of the flip plate 2 comes into contact with the ground. The inner surface 9 of the flip plate 2 and the inner surface 9 of the base plate 5 face toward each other in the primed configuration. The trigger mechanism 16 comprises a spring-tensioned latch 17 and a rotation slot 21. The rotation slot 21 traverses through the fulcrum 15 and the base plate 5 while the fulcrum 15 is connected normal and adjacent to the outer surface 10 of the base plate 5. The spring-tensioned latch 17 is positioned within the rotation slot 21 and is mounted in between the fulcrum 15. This allows the spring-tensioned latch 17 to rotate within the fulcrum 15 when the trigger mechanism 16 is actuated. The fulcrum 15 provides clearance for the spring-tensioned latch 17 to rotate within the rotation slot 21 when the trigger mechanism 16 is actuated. The clutched servo mechanism 25 comprises a linkage bar 26 that is utilized to join the clutched servo mechanism 25 to the trigger mechanism 16. The spring-tensioned latch 17 is pivotally and adjacently connected to the linkage bar 26, allowing the clutched servo mechanism 25 to rotate the spring-tensioned latch 17 about the fulcrum 15. The catch 32 is mounted normal and adjacent to the inner surface 9 of the flip plate 2, allowing the spring-tensioned latch 17 to engage the catch 32 prior to deployment of the trigger mechanism 16. The spring-tensioned latch 17 is selectively engaged to the catch 32 in order to allow the user to actuate the trigger mechanism 16 and return the overturned vehicle to an upright orientation.

The spring-loaded piano hinge 1 further comprises a pivot axle 11 and a plurality of torsion springs 12. The pivot axle 11 allows the flip plate 2 and the base plate 5 to rotate about the pivot axle 11 when the trigger mechanism 16 is actuated. The plurality of torsion springs 12 is utilized to forcibly rotate the flip plate 2 about the pivot axle 11 when the trigger mechanism 16 is actuated. Each of the plurality of torsion springs 12 comprises a first leg 13 and a second leg 14. The first leg 13 and the second leg 14 form the two ends of each of the plurality of torsion springs 12 located on opposite ends of the coiled portion of each spring. The flip plate 2 and the base plate 5 are hingedly connected by the pivot axle 11 with the inner surface 9 of the flip plate 2 and the inner surface 9 of the base plate 5 facing toward each other. This allows the flip plate 2 to rotate about the pivot axle 11 when the overturned vehicle is being returned to its upright orientation and when the present invention is being returned to its primed configuration. The plurality of torsion springs 12 is distributed along the pivot axle 11 with the pivot axle 11 being encircled by each of the plurality of torsion springs 12. The plurality of torsion springs 12 is thus held in place on the pivot axle 11 in order to allow the plurality of torsion springs 12 to uniformly apply opposing torques upon the flip plate 2 and the base plate 5. The plurality of torsion springs 12 comes into contact with both the flip plate 2 and the base plate 5 and serves to forcibly rotate the flip plate 2 about the pivot axle 11. As such, the first leg 13 for each of the plurality of torsion springs 12 is pressed against the inner surface 9 of the flip plate 2 while the second leg 14 for each of the plurality of torsion springs 12 is pressed against the inner surface 9 of the base plate 5.

The flip plate 2 further comprises a left flip plate flange 3 and a right flip plate flange 4. Similarly, the base plate 5 further comprises a left base plate flange 7 and a right base plate flange 8. The left flip plate flange 3 and the right flip plate flange 4 are positioned opposite to each other across the flip plate 2 while the left base plate flange 7 and the right base plate flange 8 are positioned opposite to each other across the base plate 5. The left flip plate flange 3 and the left base plate flange 7 are rotatably connected to the pivot axle 11 while the right flip plate flange 4 and the right base plate flange 8 are rotatably connected to the pivot axle 11. The left flip plate flange 3, the right flip plate flange 4, the left base plate flange 7, and the right base plate flange 8 serve to join the flip plate 2 and the base plate 5 to the pivot axle 11 and to each other as well.

The clutched servo mechanism 25 is positioned in between the pivot axle 11 and the rotation slot 21. The clutched servo mechanism 25 is separated from the rotation slot 21 and the spring-tensioned latch 17 within the rotation slot 21 by the linkage bar 26. The positioning of the clutched servo mechanism 25 in between the pivot axle 11 and the rotation slot 21 provides sufficient spacing for the linkage bar 26 joining the clutched servo mechanism 25 to the spring-tensioned latch 17.

The catch 32 comprises a clevis pin 34, a first bracket 35, a second bracket 36, and an access hole 33. The clevis pin 34 is utilized to hold the flip plate 2 in place on the base plate 5 prior to flipping the upright vehicle to an upright orientation. The first bracket 35 and the second bracket 36 secure the clevis pin 34 in place on the flip plate 2. The access hole 33 traverses through the flip plate 2 and allows the user to access the spring-tensioned latch 17 when manually resetting the present invention to the primed configuration. The first bracket 35 and the second bracket 36 are mounted normal and adjacent to the inner surface 9 of the flip plate 2. Additionally, the first bracket 35 and the second bracket 36 are positioned opposite to each other across the latch access hole 33. The first bracket 35 and the second bracket 36 provide two points for securing the clevis pin 34 in place on the inner surface 9 of the flip plate 2. The clevis pin 34 is mounted from the first bracket 35 to the second bracket 36 across the access hole 33. The positioning of the clevis pin 34 allows the latch to be selectively engaged to the clevis pin 34.

The present invention is designed to be mounted to the top surface, side surface, or other suitable surface of the vehicle. The base plate 5 further comprises a plurality of vehicle mounting holes 6. The plurality of vehicle mounting holes 6 is distributed across the base plate 5 in order to provide several points on the base plate 5 for securing the base plate 5 to the vehicle. The plurality of vehicle mounting holes 6 traverses through the base plate 5 in order to allow various types of fasteners to be inserted through the plurality of vehicle mounting holes 6 in order to secure the base plate 5 to the vehicle.

Figure 4:
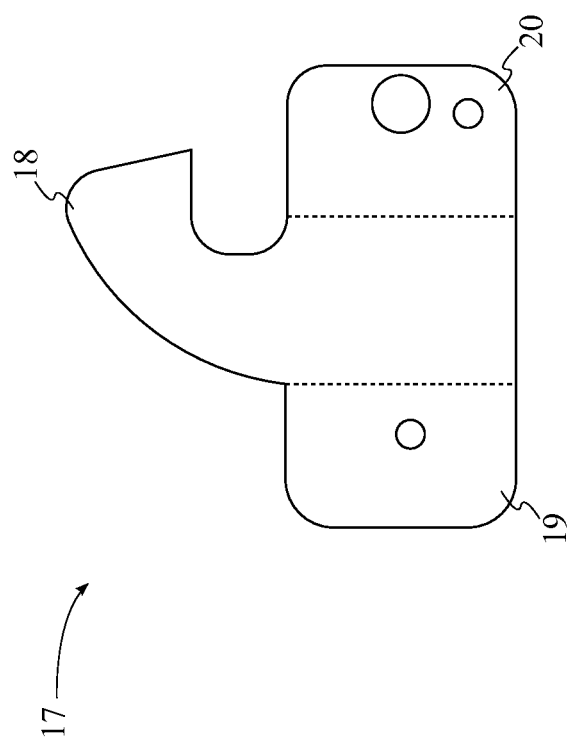
FIG. 4 is a side view of the spring-tensioned latch of the present invention.

Referring to FIG. 4, the spring-tensioned latch 17 comprises a hook portion 18, a first tab portion 19, a second tab portion 20, and at least one tension spring 22. The at least one tension spring 22 comprises a first tension spring end 23 and a second tension spring end 24. The at least one tension spring 22 serves to maintain the spring-tensioned latch 17 in place when the present invention is in the primed configuration. As such, the at least one tension spring 22 prevents unwanted rotation of the spring-tensioned latch 17 about the fulcrum 15 resulting in an unintended deployment of the present invention. The first tension spring end 23 is rotatably connected to the outer surface 10 of the base plate 5 while the second tension spring end 24 is rotatably connected to the first tab portion 19. The at least one tension spring 22 is able to extend as well as return to its equilibrium position based on the rotational motion of the spring-tensioned latch 17. The hook portion 18 is positioned in between the first tab portion 19 and the second tab portion 20. The hook portion 18 is selectively engaged to the clevis pin 34. When the hook portion 18 is engaged to the clevis pin 34, the flip plate 2 is secured in place over the base plate 5. However, when the hook portion 18 is disengaged from the clevis pin 34, the flip plate 2 is able to rotate about the pivot axle 11 into the primed configuration shown in FIGS. 5-7.

Figure 8:
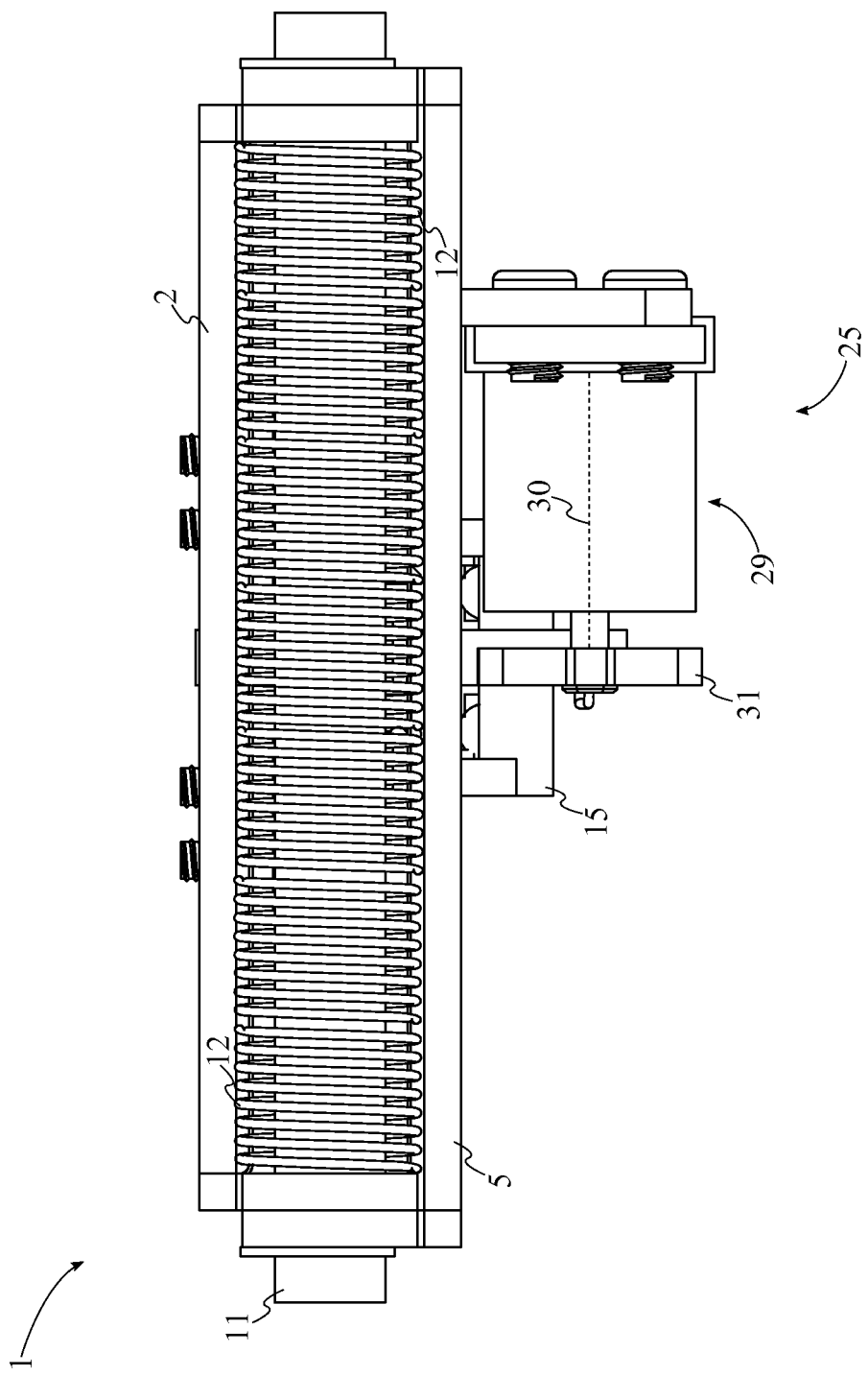
FIG. 8 is a rear view of the present invention in the primed configuration.

The clutched servo mechanism 25 further comprises a servomotor 29 and an extension arm 31. The servomotor 29 is mounted onto the outer surface 10 of the base plate 5, allowing the servomotor 29 to cause the spring-tensioned latch 17 to rotate about the fulcrum 15. A rotation axis 30 of the servomotor 29 is oriented parallel to the pivot axle 11. The extension arm 31 is axially connected to the servomotor 29 and is positioned perpendicular to the rotation axis 30. The rotation axis 30 is shown in FIG. 8. As such, the extension arm 31 is able to rotate about the rotation axis 30 due to rotational motion provided by the servomotor 29.

The linkage bar 26 comprises a first bar end 27 and a second bar end 28. The linkage bar 26 serves to join the clutched servo mechanism 25 to the trigger mechanism 16. As such, the first bar end 27 is rotatably connected to the second tab portion 20 while the second bar end 28 is rotatably connected to the extension arm 31. The linkage bar 26 transfers rotational motion provided by the clutched servo mechanism 25 to the trigger mechanism 16 in order to cause the spring-tensioned latch 17 to rotate about the fulcrum 15.

Figure 9:
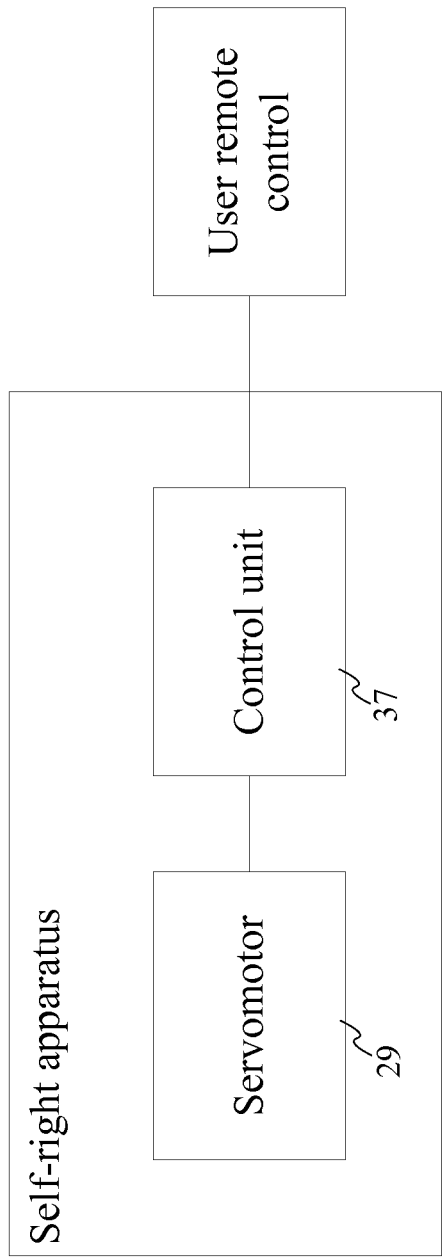
FIG. 9 is a schematic diagram of the electronic connections of the present invention.

Referring to FIG. 9, the present invention further comprises a control unit 37. The control unit 37 is electronically connected to the servomotor 29. The control unit 37 is able to initiate the process of flipping the overturned vehicle back to its original upright orientation. In an embodiment of the present invention, the user is able to wirelessly initiate the flipping process through a controller device (such as a handheld remote control) utilized to control the movement and speed of the vehicle. Alternatively, the flipping process may be initiated automatically by the present invention. For example, the present invention may comprise an accelerometer or similar sensor device for determining the orientation of the present invention and thus, the vehicle, in order to determine if the vehicle must be flipped back to an upright orientation.

Prior to the vehicle becoming overturned during the course of use, the flip plate 2, the base plate 5, the hook portion 18, and the clevis pin 34 are in a primed configuration. The base plate 5 is overlapped by the flip plate 2 such that the flip plate 2 is folded over onto the base plate 5 through the pivot axle 11. As such, the flip plate 2 and the base plate 5 are positioned parallel to each other. The hook portion 18 is engaged to the clevis pin 34 as well, holding the flip plate 2 in position parallel to the base plate 5. The clevis pin 34 holds the flip plate 2 in place in order to prevent the flip plate 2 from rotating about the pivot axle 11 due to the first leg 13 for each of the plurality of torsion springs 12 being pressed against the inner surface 9 of the flip plate 2 and the second leg 14 for each of the plurality of torsion springs 12 being pressed against the inner surface 9 of the base plate 5.

Figure 5:
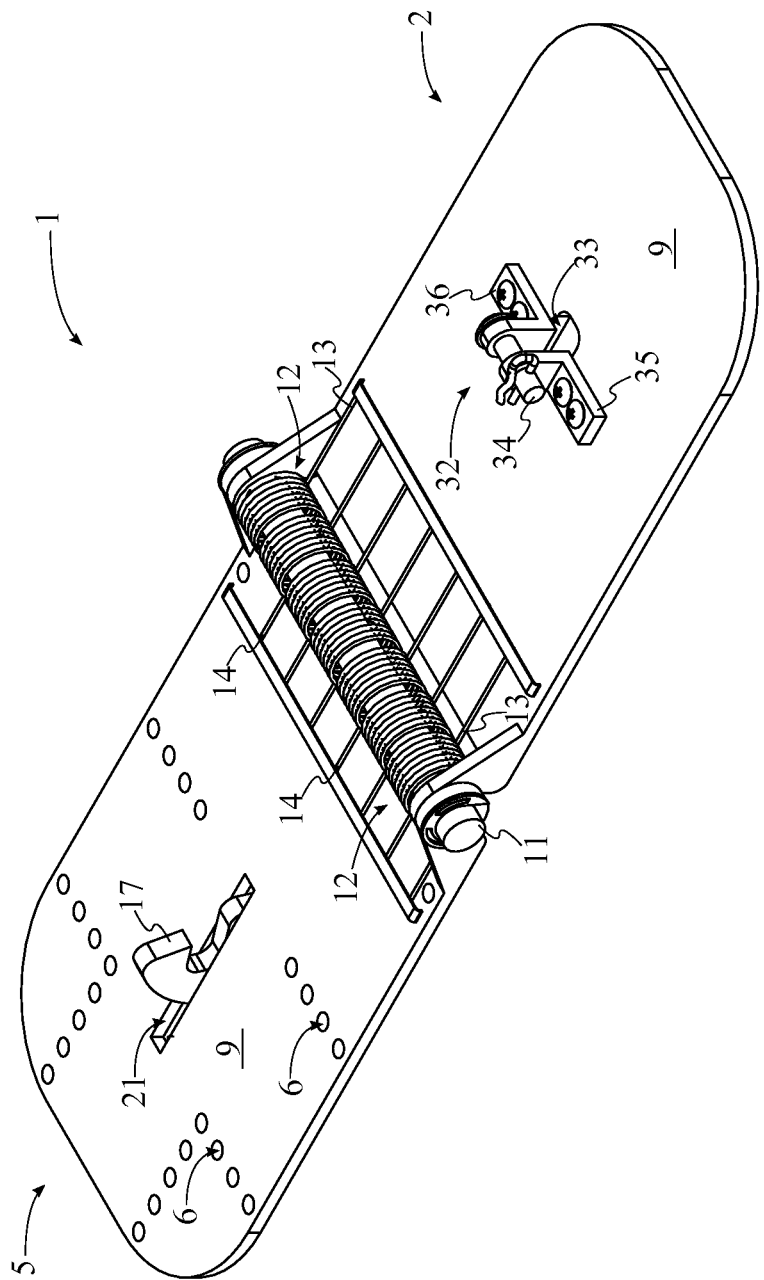
FIG. 5 is a perspective view of the present invention in a deployed configuration.
Figure 6:
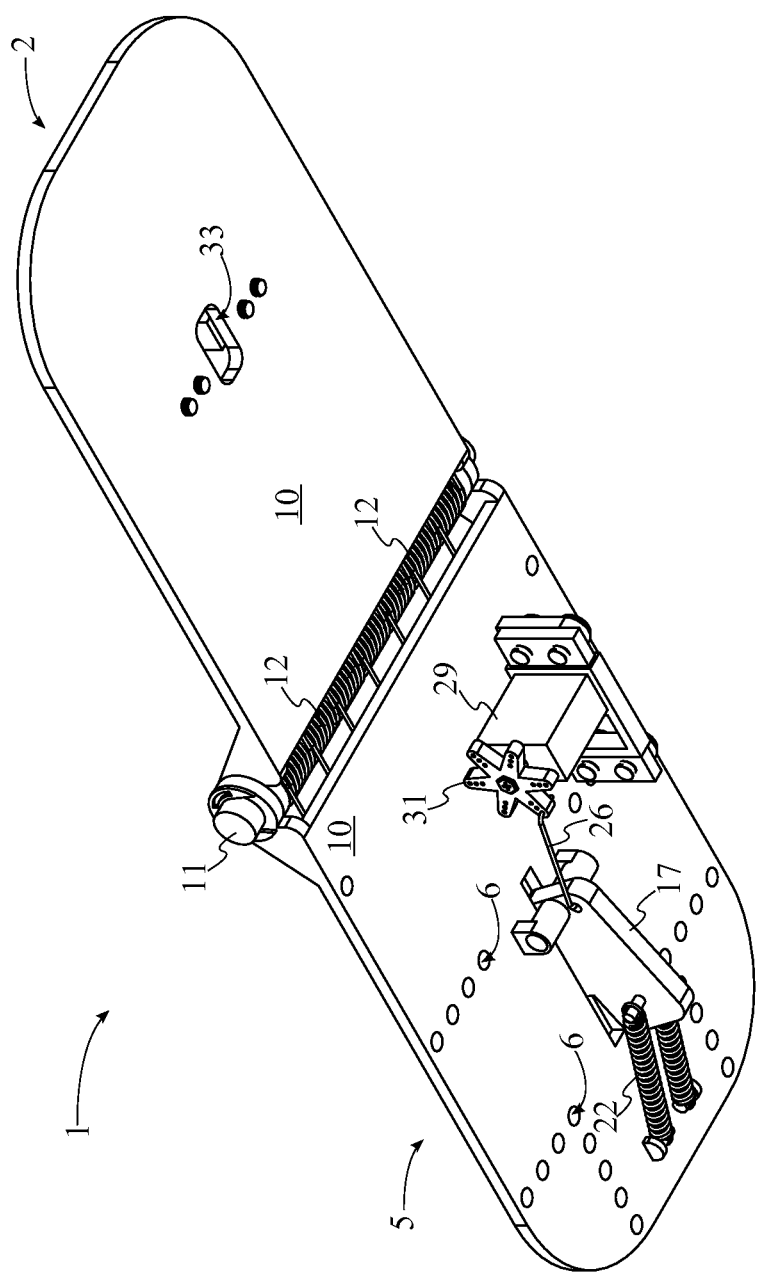
FIG. 6 is an alternative perspective view of the present invention in the deployed configuration.
Figure 7:
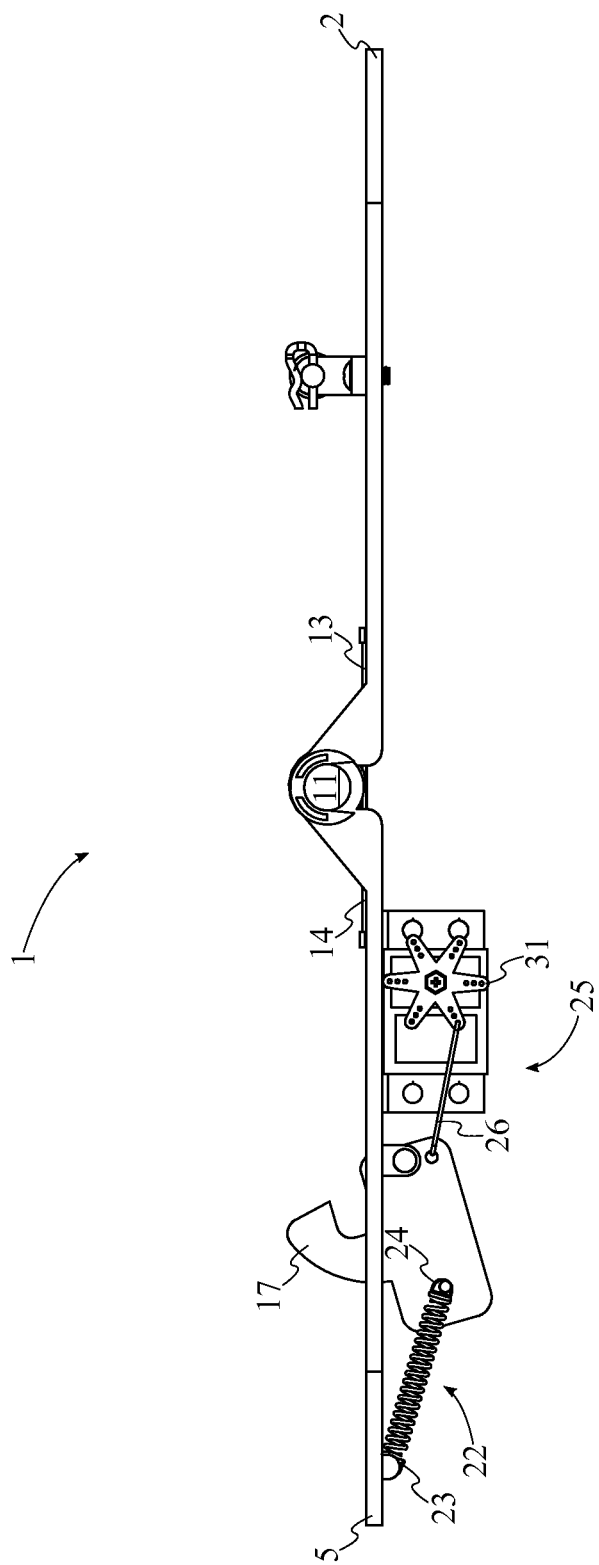
FIG. 7 is a side view of the present invention in the deployed configuration.
Figure 10:
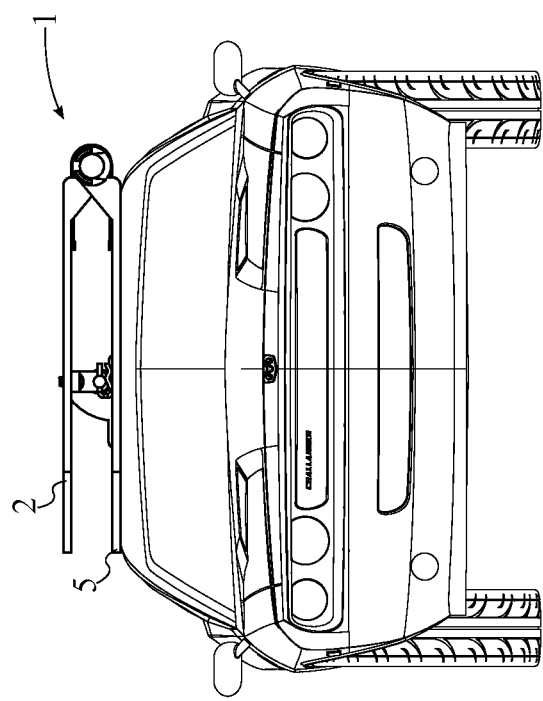
FIG. 10 is an example drawing of the present invention mounted to a vehicle in an upright orientation.
Figure 11:
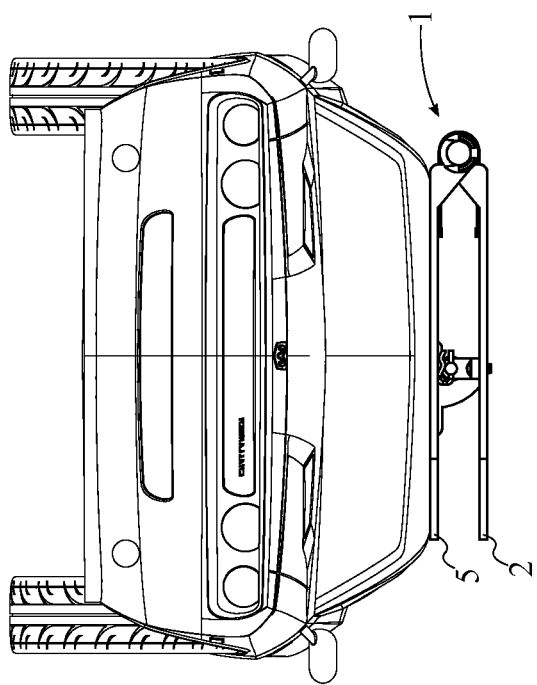
FIG. 11 is an example drawing of the present invention mounted to a vehicle in an overturned orientation.
Figure 12:
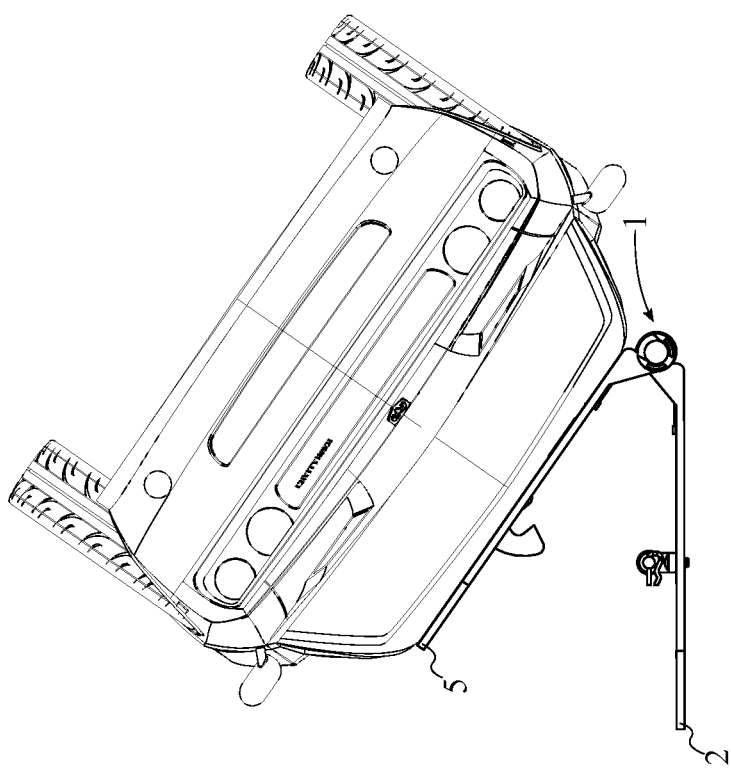
FIG. 12 is an example drawing of the present invention after the trigger mechanism has been actuated and the vehicle is in the process of returning to the upright orientation.
Figure 13:
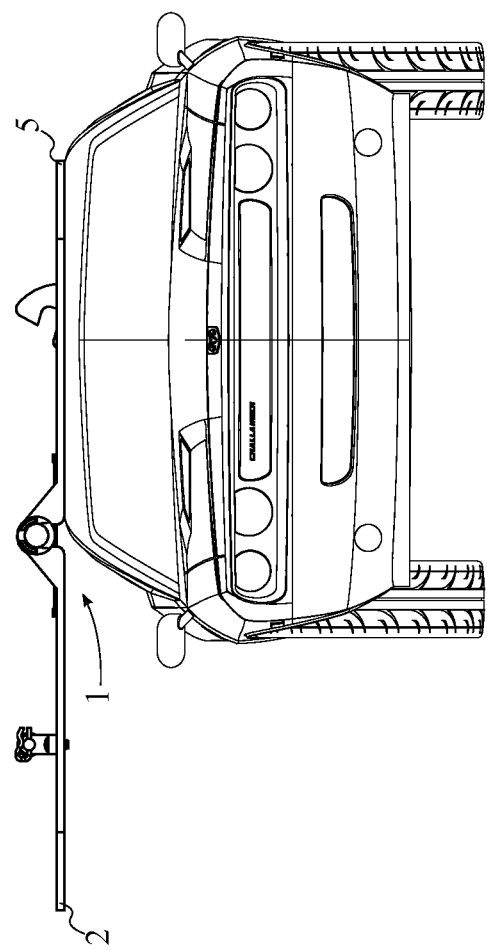
FIG. 13 is an example drawing of the present invention after being returned to the upright orientation.

The deployed configuration of the present invention is shown in FIGS. 5-7. An example diagram of the present invention mounted to a vehicle in the upright orientation is shown in FIG. 10. When the vehicle has become overturned, as shown in FIG. 11, the user may manually initiate the flipping process or the flipping process may be automatically initiated by the present invention. When the flipping process is initiated, the clutched servo mechanism 25 is actuated which rotates the extension arm 31. The rotational motion of the extension arm 31 is translated through the linkage bar 26 to the second tab portion 20. This causes the spring-tensioned latch 17 to rotate and the hook portion 18 is disengaged from the clevis pin 34. When the hook portion 18 is fully clear of the clevis pin 34, the flip plate 2 is released from the base plate 5. The flip plate 2 is then able to rotate about the pivot axle 11 due to the force exerted on the flip plate 2 and the base plate 5 provided by the plurality of torsion springs 12. As the flip plate 2 rotates, the outer surface 10 of the flip plate 2 is pressed against the surface on which the overturned vehicle is resting as shown in FIG. 12, causing the vehicle to flip and return to an upright orientation. After the vehicle has been returned to an upright orientation, the flip plate 2, the base plate 5, and the hook portion 18 are in the deployed configuration as shown in FIG. 13. The flip plate 2 is rotated about the pivot axle 11 until the flip plate 2 and the base plate 5 are positioned coplanar to each other.

Once the vehicle has been returned to an upright orientation, the present invention may be returned to the primed configuration. In an embodiment of the present invention, the present invention is manually returned to the primed configuration. The flip plate 2 is manually rotated back to the primed configuration in which the flip plate 2 and the base plate 5 are positioned parallel to each other. The user is able to manually reengage the hook portion 18 to the clevis pin 34 through the access hole 33. Once the hook portion 18 has been reengaged to the clevis pin 34, the flip plate 2 is held in place overlapping the flip plate 2 until the flipping process is initiated manually or automatically.

The present invention is primarily intended for use in conjunction with an R/C vehicle such as an R/C car in order to prevent the user from having to manually return the R/C to an upright orientation when the R/C car has become overturned. However, an embodiment of the present invention may be utilized in conjunction with a full-sized vehicle. When the present invention is mounted to a vehicle, various components of the present invention such as the clutched servo mechanism 25 and the at least one tension spring 22 may be positioned within the body of the vehicle.

Although the invention has been explained in relation to its preferred embodiment, it is to be understood that many other possible modifications and variations can be made without departing from the spirit and scope of the invention as hereinafter claimed.

What is claimed is:
1. A self-right apparatus comprises:
a spring-loaded piano hinge;
a trigger mechanism;
a catch;
a fulcrum;
a clutched servo mechanism;
the spring-loaded piano hinge comprises a flip plate and a base plate;
the trigger mechanism comprises a spring-tensioned latch and a rotation slot;
the clutched servo mechanism comprises a linkage bar;
the flip plate and the base plate each comprise an inner surface and an outer surface;
the fulcrum being connected normal and adjacent to the outer surface of the base plate;
the rotation slot traversing along the fulcrum and through the base plate;
the spring-tensioned latch being positioned within the rotation slot;
the spring-tensioned latch being rotatably mounted on the fulcrum;
the spring-tensioned latch being pivotally and adjacently connected to the linkage bar;
the catch being mounted normal and adjacent to the inner surface of the flip plate; and
the spring-tensioned latch being selectively engaged to the catch.
2. The self-right apparatus as claimed in claim 1 further comprises:
the catch comprises a clevis pin, a first bracket, a second bracket, and an access hole;
the access hole traversing through the flip plate;
the first bracket and the second bracket being mounted normal and adjacent to the inner surface of the flip plate;
the first bracket and the second bracket being positioned opposite to each across the latch access hole; and the clevis pin being mounted from the first bracket to the second bracket across the access hole.

3. The self-right apparatus as claimed in claim 1 further comprises:
the base plate further comprises a plurality of vehicle mounting holes;
the plurality of vehicle mounting holes being distributed across the base plate; and
the plurality of vehicle mounting holes traversing through the base plate.

4. The self-right apparatus as claimed in claim 1 further comprises:
the clutched servo mechanism further comprises a servomotor and an extension arm;
the servomotor being mounted onto the outer surface of the base plate;
a rotation axis of the servomotor being oriented parallel to a pivot axle of the spring-loaded piano hinge;
the extension arm being axially connected to the servomotor; and
the extension arm being positioned perpendicular to the rotation axis.

5. The self-right apparatus as claimed in claim 1 further comprises:
the linkage bar comprises a first bar end and a second bar end;
the first bar end being rotatably connected to a second tab portion of the spring-tensioned latch; and
the second bar end being rotatably connected to an extension arm of the clutched servo mechanism.

6. The self-right apparatus as claimed in claim 1 further comprises:
a control unit; and
the control unit being electronically connected to a servomotor of the clutched servo mechanism.

7. The self-right apparatus as claimed in claim 1 further comprises:
wherein the flip plate, the base plate, a hook portion of the spring-tensioned latch, and a clevis pin of the catch are in a primed configuration;
the base plate being overlapped by the flip plate;
the flip plate and the base plate being positioned parallel to each other; and
the hook portion being engaged to the clevis pin.

8. The self-right apparatus as claimed in claim 1 further comprises:
wherein the flip plate, the base plate, and a hook portion of a spring-tensioned latch are in a deployed configuration; and
the flip plate and the base plate being positioned coplanar to each other.

9. The self-right apparatus as claimed in claim 1 further comprises:
the spring-loaded piano hinge further comprises a pivot axle and a plurality of torsion springs;
each of the plurality of torsion springs comprises a first leg and a second leg;
the flip plate and the base plate being hingedly connected by the pivot axle;
the plurality of torsion springs being distributed along the pivot axle;
the pivot axle being encircled by each of the plurality of torsion springs;
the first leg for each of the plurality of torsion springs being pressed against the inner surface of the flip plate; and
the second leg for each of the plurality of torsion springs being pressed against the inner surface of the base plate.

10. The self-right apparatus as claimed in claim 9 further comprises:
the flip plate further comprises a left flip plate flange and a right flip plate flange;
the base plate further comprises a left base plate flange and a right base plate flange;
the left flip plate flange and the right flip plate flange being positioned opposite to each other, across the flip plate;
the left base plate flange and the right base plate flange being positioned opposite to each other, across the base plate;
the left flip plate flange and the left base plate flange being rotatably connected to the pivot axle; and
the right flip plate flange and the right base plate flange being rotatably connected to the pivot axle.

11. The self-right apparatus as claimed in claim 9 further comprises:
the clutched servo mechanism being positioned in between the pivot axle and the rotation slot.

12. The self-right apparatus as claimed in claim 1 further comprises:
the spring-tensioned latch comprises a hook portion, a first tab portion, a second tab portion, and at least one tension spring;
the at least one tension spring comprises a first tension spring end and a second tension spring end;
the hook portion being positioned in between the first tab portion and the second tab portion;
the first tension spring end being rotatably connected to the outer surface of the base plate; and
the second tension spring end being rotatably connected to the first tab portion.

13. The self-right apparatus as claimed in claim 12 further comprises:
the hook portion being selectively engaged to a clevis pin of the catch.

14. A self-right apparatus comprises:
a spring-loaded piano hinge;
a trigger mechanism;
a catch;
a fulcrum;
a clutched servo mechanism;
a control unit;
the spring-loaded piano hinge comprises a flip plate, a base plate, a pivot axle, and a plurality of torsion springs;
each of the plurality of torsion springs comprises a first leg and a second leg;
the trigger mechanism comprises a spring-tensioned latch and a rotation slot;
the catch comprises a clevis pin, a first bracket, a second bracket, and an access hole;
the clutched servo mechanism comprises a linkage bar, a servomotor, and an extension arm;
the flip plate and the base plate each comprise an inner surface and an outer surface;
the fulcrum being connected normal and adjacent to the outer surface of the base plate;
the rotation slot traversing along the fulcrum and through the base plate;
the spring-tensioned latch being positioned within the rotation slot;
the spring-tensioned latch being rotatably mounted on the fulcrum;
the spring-tensioned latch being pivotally and adjacently connected to the linkage bar;
the catch being mounted normal and adjacent to the inner surface of the flip plate;

the spring-tensioned latch being selectively engaged to the catch;

the flip plate and the base plate being hingedly connected by the pivot axle;

the plurality of torsion springs being distributed along the pivot axle;

the pivot axle being encircled by each of the plurality of torsion springs;

the first leg for each of the plurality of torsion springs being pressed against the inner surface of the flip plate;

the second leg for each of the plurality of torsion springs being pressed against the inner surface of the base plate;

the clutched servo mechanism being positioned in between the pivot axle and the rotation slot;

the control unit being electronically connected to the servomotor;

the access hole traversing through the flip plate;

the first bracket and the second bracket being mounted normal and adjacent to the inner surface of the flip plate;

the first bracket and the second bracket being positioned opposite to each across the latch access hole;

the clevis pin being mounted from the first bracket to the second bracket across the access hole;

the servomotor being mounted onto the outer surface of the base plate;

a rotation axis of the servomotor being oriented parallel to the pivot axle;

the extension arm being axially connected to the servomotor; and the extension arm being positioned perpendicular to the rotation axis.

15. The self-right apparatus as claimed in claim 14 further comprises:

the flip plate further comprises a left flip plate flange and a right flip plate flange;

the base plate further comprises a left base plate flange and a right base plate flange;

the left flip plate flange and the right flip plate flange being positioned opposite to each other, across the flip plate;

the left base plate flange and the right base plate flange being positioned opposite to each other, across the base plate;

the left flip plate flange and the left base plate flange being rotatably connected to the pivot axle; and the right flip plate flange and the right base plate flange being rotatably connected to the pivot axle.

16. The self-right apparatus as claimed in claim 14 further comprises:

the base plate further comprises a plurality of vehicle mounting holes;

the plurality of vehicle mounting holes being distributed across the base plate; and the plurality of vehicle mounting holes traversing through the base plate.

17. The self-right apparatus as claimed in claim 14 further comprises:

the spring-tensioned latch comprises a hook portion, a first tab portion, a second tab portion, and at least one tension spring;

the at least one tension spring comprises a first tension spring end and a second tension spring end;

the hook portion being positioned in between the first tab portion and the second tab portion;

the first tension spring end being rotatably connected to the outer surface of the base plate;

the second tension spring end being rotatably connected to the first tab portion; and the hook portion being selectively engaged to the clevis pin of the catch.

18. The self-right apparatus as claimed in claim 14 further comprises:

the linkage bar comprises a first bar end and a second bar end;

the first bar end being rotatably connected to a second tab portion of the spring-tensioned latch; and the second bar end being rotatably connected to the extension arm of the clutched servo mechanism.

19. The self-right apparatus as claimed in claim 14 further comprises:

wherein the flip plate, the base plate, a hook portion of the spring-tensioned latch, and the clevis pin of the catch are in a primed configuration;

the base plate being overlapped by the flip plate;

the flip plate and the base plate being positioned parallel to each other; and the hook portion being engaged to the clevis pin.

20. The self-right apparatus as claimed in claim 14 further comprises:

wherein the flip plate, the base plate, and a hook portion of the spring-tensioned latch are in a deployed configuration; and the flip plate and the base plate being positioned coplanar to each other.

* * * * *